US00RE39483E

(19) United States
(12) Reissued Patent
Goto

(10) Patent Number: US RE39,483 E
(45) Date of Reissued Patent: Feb. 6, 2007

(54) OPTICAL DISC PLAYER HAVING PROGRAM TITLE DISPLAY

(75) Inventor: Soju Goto, Hino (JP)

(73) Assignee: Kabushiki Kaisha Kenwood, Tokyo (JP)

(21) Appl. No.: 08/731,925

(22) Filed: Oct. 18, 1996

Related U.S. Patent Documents

Reissue of:
(64) Patent No.: 5,508,984
Issued: Apr. 16, 1996
Appl. No.: 08/142,131
Filed: Oct. 28, 1993

(30) Foreign Application Priority Data

Oct. 30, 1992 (JP) ..... 4-316444
Oct. 30, 1992 (JP) ..... 4-316445

(51) Int. Cl.
*G11B 7/00* (2006.01)

(52) U.S. Cl. ..... 369/47.13; 369/53.1
(58) Field of Classification Search ..... 369/47, 369/48, 49, 54, 58, 59, 124, 32
See application file for complete search history.

(56) References Cited

U.S. PATENT DOCUMENTS 5,029,153 A * 7/1991 Tomoda et al.
5,124,963 A * 6/1992 Ando
5,228,021 A * 7/1993 Sato et al.

FOREIGN PATENT DOCUMENTS

EP 0 346 979 12/1989
EP 0 399 853 11/1990
EP 0399853 * 11/1990
EP 0 406 021 1/1991

(Continued)

OTHER PUBLICATIONS

European Search Report dated Mar. 20, 2002.
Patent Abstracts of Japan, vol. 14, No. 376, dated Aug. 14, 1990, and JP 02–139782 published May 29, 1990 entitled "Disk Recording and Reproducing Device".

(Continued)

*Primary Examiner*—Muhammad Edun
(74) *Attorney, Agent, or Firm*—Eric J. Robinson; Robinson Intellectual Property Law Office, P.C.

(57) ABSTRACT

Large characters and numerals of a lapse time, a musical program title, or the like of a musical program under the performance recorded on a photomagnetic disc can be displayed, and an inadvertent erase of a musical program can be prevented. The TNO and lapse time of each musical program during the performance are displayed on a display unit as shown in FIG. 3 at (f). Under this condition, when a title key is depressed, the title for the TNO is displayed for a predetermined time period on the display unit as shown in FIG. 3 at (g). After the predetermined time period, the lapse time for the TNO is displayed as shown in FIG. 3 at (h). When an erase key is depressed during the performance of a musical program, a controller erases the disc management information and additional information for the TNO from a RAM storing U-TOC information, and renumbers other TNOs to update the contents of RAM. Upon depression of a tray open key of a key matrix, the controller instructs an MD record/reproduction unit to stop the reproduction and copies the management information and additional information for the TNO stored in RAM to another RAM and records the copied information to a U-TOC area of a mini disc. Thereafter, the MD record/reproduction unit operates to eject out the disc cartridge.

2 Claims, 3 Drawing Sheets

FOREIGN PATENT DOCUMENTS

| | | | |
|---|---|---|---|
| EP | 0 535 732 A2 | | 4/1993 |
| JP | 56-115795 | | 9/1981 |
| JP | 59-040371 | * | 3/1984 |
| JP | 59040371 | | 3/1984 |
| JP | 61-147658 | | 7/1986 |
| JP | 63255889 | | 10/1988 |
| JP | 1037790 | * | 2/1989 |
| JP | 64-43887 | | 2/1989 |
| JP | 2139782 | * | 5/1990 |
| JP | 2-139782 | | 5/1990 |
| JP | 2187979 | * | 7/1990 |
| JP | 3-98725 | | 10/1991 |
| JP | 4-105269 | | 4/1992 |
| JP | 4-285785 | | 10/1992 |
| JP | 4214267 | * | 11/1992 |
| JP | 4341990 | * | 11/1992 |
| JP | 63-100689 | * | 5/1998 |
| JP | 63100689 | | 5/1998 |
| JP | 63-255889 | * | 10/1998 |

OTHER PUBLICATIONS

Patent Abstracts of Japan, vol. 13, No. 70 dated Feb. 17, 1989, and JP 63–255889 published Oct. 24, 1988 entitled "Data File Device".

Patent Abstracts of Japan; vol. 14, No. 472 dated Oct. 15, 1990, and JP 02–187979 published Jul. 24, 1990 entitled "Disk Recording and Reproducing Device".

Patent Abstracts of Japan, vol. 17, No. 194 dated Apr. 15, 1993, and JP No. 04–341990 published Nov. 27, 1992 entitled Nov. 27, 1992 entitled "Reproducing Device".

* cited by examiner

OPTICAL DISC PLAYER HAVING PROGRAM TITLE DISPLAY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an optical disc player for playing a musical program having additional information recorded on an optical disc. More particularly, the invention relates to a method of displaying additional information of a musical program during its performance and a method of erasing a recorded musical program, suitable for a mini disc recording/reproducing apparatus (MD apparatus).

2. Related Background Art

There is known a mini disc (MD) which is one type of rewritable photomagnetic discs. A mini disc is formed with a pit information record area at the central area of the disc and a recordable area at the outer area. The recordable area includes a user's TOC (Table of Contents) area (U-TOC) and a program area. The recordable area has no pit, but a groove is engraved for the guidance to [trucks] *tracks*. Information is recorded in the recordable area along the groove.

The groove sways like wobble. The rotation of the disc is controlled by a signal having an average frequency of 22.05 kHz and generated based on the wobble. Absolute times (address information) relative to the record start position are FM-modulated and recorded in the wobble.

Data record is achieved by magnetizing a magnetic film. Namely, the magnetic film is heated to a Curie point or higher by a laser spot while applying a magnetic field which reverses its polarity depending upon an input signal. The signal is therefore recorded in the magnetic film as a change in the magnetization direction. Such data record can be performed even on an already recorded area, i.e., data overwrite is possible.

The record position is managed by the information recorded in U-TOC. Recorded in the program area is information including a start time, end time, title, and the like for each [truck] *track* number (TNO) which is a natural number beginning with "1" and assigned to each musical program. If TNO and its additional information is erased from U-TOC, the corresponding recordable area is handled as an unrecorded area.

When an MD disc is loaded on an optical disc player, U-TOC information recorded in the MD disc is read and copied to a RAM. Thereafter, data recording/reproducing is managed by the U-TOC information stored in RAM. Each time a musical program is recorded or erased, the contents of RAM are updated and recorded-in U-TOC before the disc is unloaded from the apparatus.

Additional information as well as the start time, end time, and the like of each musical program is also recorded in TOC area of a reproduction-only mini disc formed with pit trains over the whole area of its information record area.

Address information can be read from such a mini disc during the performance of a musical program. Therefore, it is possible to display a total time from the start address of TNO 1 to the address of TNO under the performance, on a display unit. The start time of TNO under the performance can also be known from TOC information, it is possible to display a single time from the start address of TOC under the performance to the current address, on the display unit. The additional information in TOC area includes a title of each TNO so that the title of each musical program under the performance can also be displayed.

Conventionally, in an optical disc player such as a CD player, a selective display between a total time, a single time, and the like has been realized by designating a display mode. Such a selective display has been used because the screen of a display unit is too small to display all information on it and characters displayed become too small.

While playing an optical disc recorded with address information and additional information such as the title of each TNO, if a mode of selectively displaying a title is set, the lapse time is not displayed. In such a case, a user accustomed with a screen display of a conventional optical disc player such as a CD player feels something restless. In addition, it is not convenient for the user to be unable to know the remaining time of the musical program under the performance.

In erasing a musical program recorded in such a mini disc, TNO of the program is keyed in to display it on a display screen and an erase key is depressed to delete TNO information from U-TOC area. This method is unsatisfactory, however, in that if a user keys in a different TNO inadvertently, the musical program not intended to be erased, is deleted.

SUMMARY OF THE INVENTION

The present invention has been made in consideration of the above circumstances. It is an object of the invention to provide an optical disc player in which a lapse time is displayed in a usual case, a title or other information of a musical program under the performance, if necessary, can be displayed by a user key operation.

It is another object of the invention to provide a photomagnetic disc recording/reproducing apparatus capable of erasing a musical program reliably without failure.

According to one aspect of the present invention, there is provided an optical disc player for reproducing a musical program recorded on an optical disc having a TOC area storing the start and end times of each musical program and additional information, wherein a lapse time is displayed on a display unit in a usual case during the performance of a musical program, and when a title key is depressed, the additional information such as the title of a musical program is displayed on the display unit for a predetermined time period.

According to the optical disc player of the invention, the lapse time of a musical program under the performance, or the lapse time from the start address of TNO 1 is displayed in a usual case. Accordingly, the performance like an ordinary CD player can be ensured.

If the additional information such as the title of a musical program under the performance is to be known, this information can be displayed for the predetermined time period upon depression of the title key, making it easy to confirm the additional information such as the title. Since the lapse time and program [tile] *title* can be selectively displayed, large characters can be displayed on the display screen allowing an easy recognition.

According to another aspect of the present invention, there is provided a photomagnetic disc recording/reproducing apparatus for reproducing a musical program recorded on a rewritable photomagnetic disc of the type that an absolute time is FM-modulated and recorded on a wobble of a groove in a program area of a record/reproduction area for each musical program and the start and end times of each recorded musical program are recorded in a user TOC area, wherein record information of an optional musical program stored in the user TOC area and including the start time is erased by depressing an erase key during the performance of the optional musical program so that user TOC information of the optional musical program stored in a RAM of the recording/reproducing apparatus is erased, and that the contents of the RAM are recorded in the user TOC before the photomagnetic disc is ejected out from the recording/reproducing apparatus.

In the photomagnetic disc recording/reproducing apparatus, two consecutive musical programs may be combined as having a single musical program number by depressing a cancel key during the performance of the later musical program of the two consecutive musical programs, and an optional musical program may be divided into two musical programs by depressing an insert key during the performance of the optional musical program.

According to the photomagnetic disc recording/reproducing apparatus of the invention, in erasing an optional musical program among a plurality of musical programs recorded on a disc, the erase key is depressed to erase the information of the program from the user TOC area while listening to the program by using a rapid advance function or a search function, preventing an inadvertent erase of a musical program.

If the information of a musical program is erased from user TOC information stored in a RAM of the apparatus by depressing the erase key, the record area for that program is thereafter treated as an unrecorded area. Therefore, a new program can be overwritten at that area.

Since the contents of RAM are recorded in the user TOC area before the photomagnetic disc is ejected out from the apparatus, the user TOC information is stored in RAM when the disc is again loaded while maintaining the previous erased conditions.

Dividing a program or combining programs is executed while the subject program is being performed, thereby preventing a different program to be divided or combined.

DETAILED DESCRIPTION OF THE PREFERRED EMBODIMENTS

Figure 1:
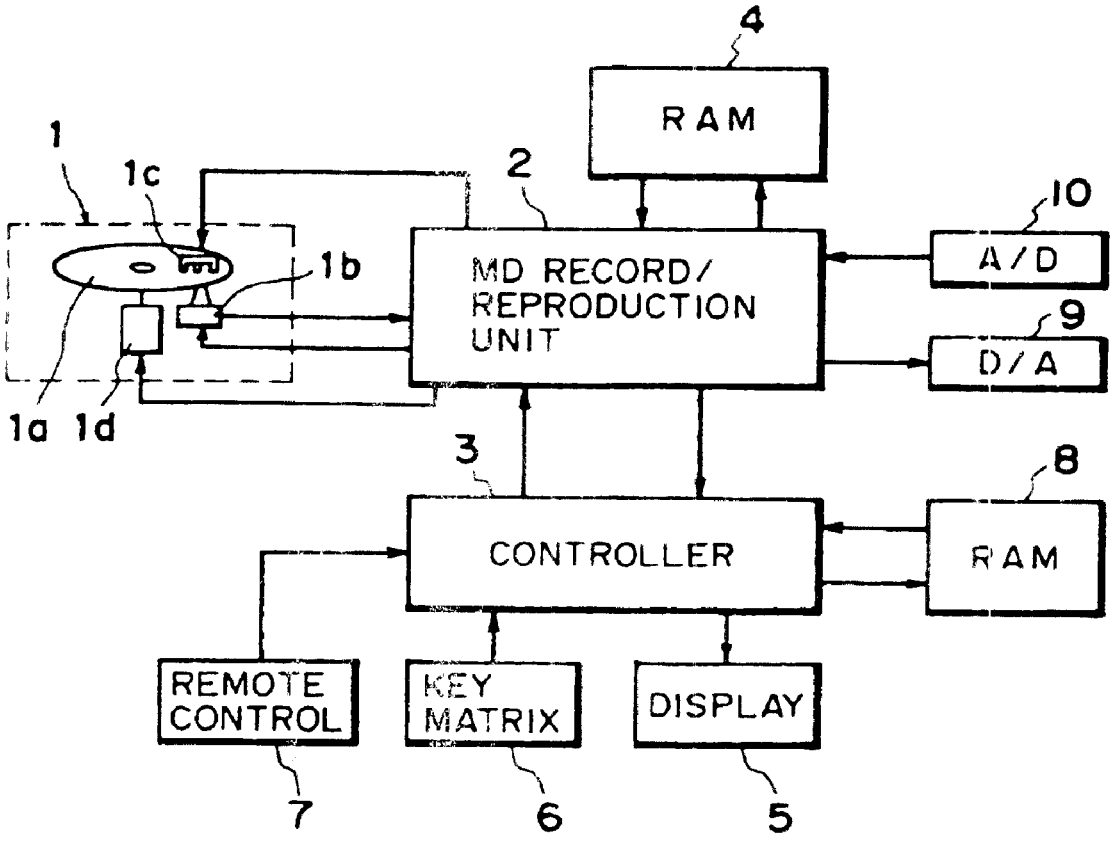
FIG. 1 is a block diagram showing an embodiment of an MD recording/reproducing apparatus according to the present invention.

An embodiment of the optical disc recording/reproducing apparatus according to the present invention will be described with reference to the accompanying drawings. FIG. 1 is a block diagram showing an embodiment of an MD recording/reproducing apparatus according to the invention. Reference numeral 1 represents an MD mechanism for rotating a mini disc la to read and write information from and to the mini disc. The MD mechanism 1 includes a disc motor 1d for rotating the mini disc 1a loaded by a loading mechanism (not shown) and placed on a turntable, a light pickup 1b and its feeding mechanism for heating the mini disc 1a to read and write information from and to the mini disc 1a, and a magnetic head 1c and its loading mechanism for applying a magnetic field as record information to the heated area of the mini disc 1a.

Reference numeral 2 represents an MD record/reproduction. For the data record, the MD record/reproduction unit 2 controls the operation of the MD mechanism 1, compresses voice digital data sent from an A/D converter 10 by an ATRAC (adaptive transform coding) scheme, and stores the compressed data in a RAM 4. When a predetermined amount of data is stored in RAM 4, the compressed voice data is read and encoded in a CD-ROM format, added with an error correcting code by an ACIRC scheme, and interleaved to apply an FM-modulated signal to the magnetic head 1c.

For the data reproduction, the MD record/reproduction unit 2 FM-demodulates a signal read by the optical pickup 1b, ACIRC-demodulates it to obtain a signal of a CD-ROM format which is decoded and stored in RAM 4 as the compressed voice data. The compressed voice data stored in RAM 4 is read to recover the original voice data by the ATRAC scheme which is transferred to a D/A converter 9.

The MD record/reproduction unit 2 also decodes information recorded on the disc, sends the decoded data to a controller 3, and adds sub-code information to the record information on the disc in response to an instruction from the controller 3.

The controller 3 receives mechanism control information, address information stored in RAM 4, and address information and record information written in the disc, from the MD record/reproduction unit 2, and generates mechanism control information, address control information for RAM 4, and information to be recorded in the disk to send the generated information back to the MD record/reproduction unit 2.

The controller 3 also generates disc management information and disc additional information to store the generated information in a RAM 8, receives signals from a key matrix 6 or an infrared ray remote controller 7 to control associated circuits and send display information to a display unit 5.

RAM 4 temporarily stores information read from the disc and information to be written on the disc. The display unit 5 displays information sent from the controller 3 on its screen. The key matrix 6 is operated by a user to send an operation instruction to the controller 3. The infrared ray remote controller 7 has the same function as that of the key matrix 6.

RAM 8 is controlled by the controller 3 and temporarily stores disc management information and disc additional information. The D/A converter 9 converts a digital voice signal into an analog voice signal, the digital voice signal sent from the MD record/reproduction unit 2 having been sampled at a frequency of 44.1 kHz and having a quantization number of 16 bits. The A/D converter 10 converts a voice signal sent from the analog circuit into a digital voice signal sampled at the frequency of 44.1 kHz and having the quantization number of 16 bits, and sends the digital voice signal to the MD record/reproduction unit 2.

Figure 2:
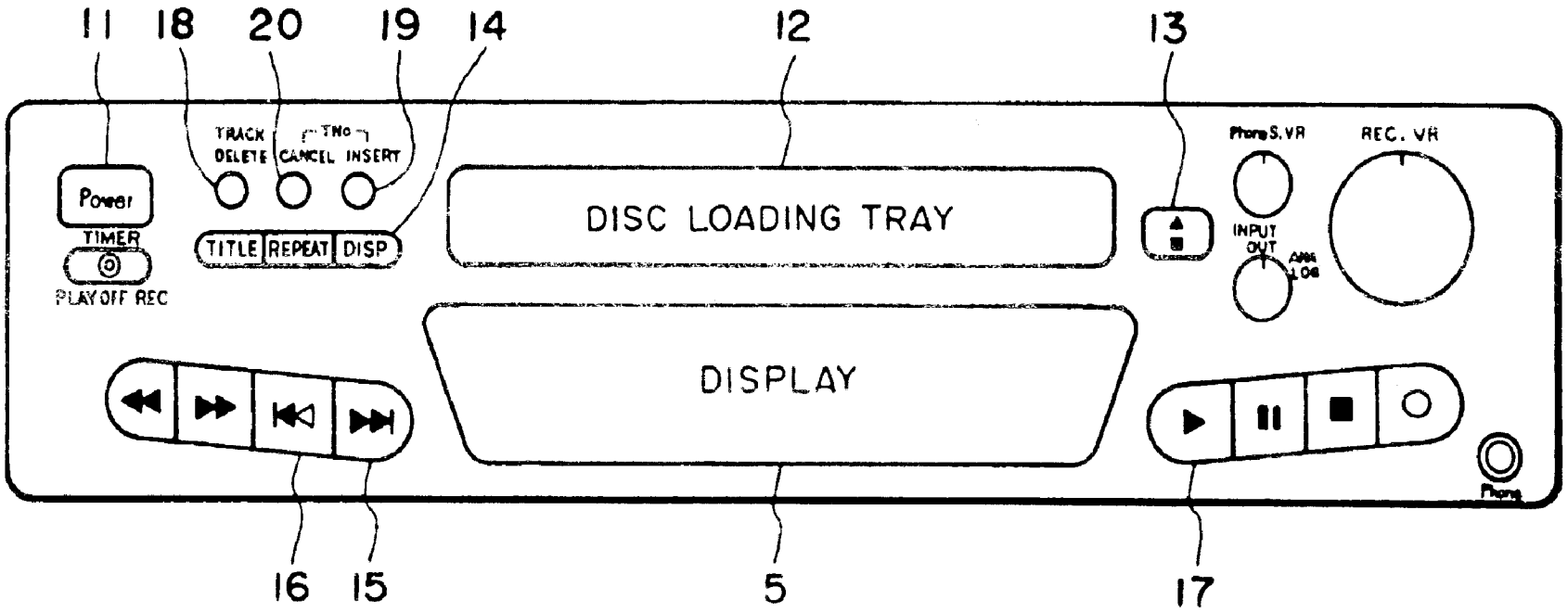
FIG. 2 is a front view of a front panel of the apparatus shown in FIG. 1.
Figure 3A:
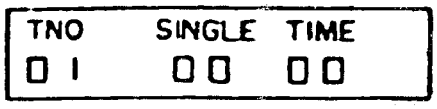
FIG. 3 is a diagram showing examples of displayed representations on the display unit of the apparatus shown in FIG. 1.
Figure 3B:
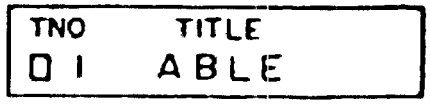
Figure 3C:
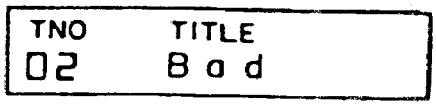
Figure 3D:
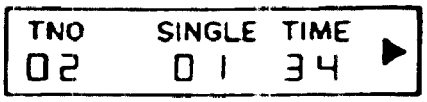
Figure 3E:
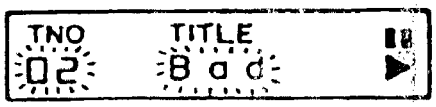
Figure 3F:
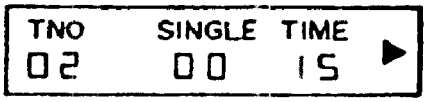
Figure 3G:
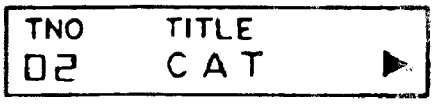
Figure 3H:
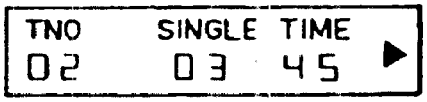
Figure 3I:
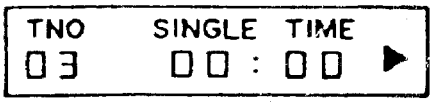
Figure 3J:
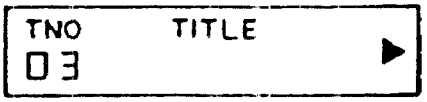
Figure 3K:
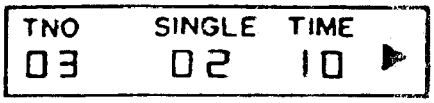
Figure 3L:
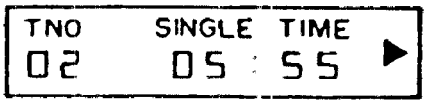
Figure 3M:
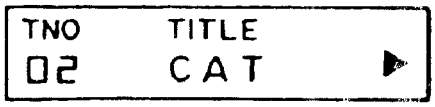
Figure 3N:
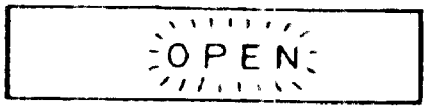

FIG. 2 shows the front panel of the MD recording/reproducing apparatus. In FIG. 2, reference numeral 12 represents a tray on which a disc is loaded, and reference numeral 11 represents a power switch. Reference numerals 13 to 20 represent keys of the key matrix 6.

Reference numeral 13 represents a tray open key for alternately opening and closing the tray 12 each time this key is depressed and for initiating the disc unload/load operation. Reference numeral 14 represents a title key for displaying the title of a musical program under the performance.

Reference numeral 15 represents a TNO forward key for the advance of TNOs, and reference numeral 16 represents a TNO backward key for the retreat of TNOs. Reference numeral 17 represents a play key for playing the disc.

Reference numeral 18 represents an erase key for erasing a musical program under the performance. Reference numeral 19 represents a [truck] *track* number insert key for inserting a new [truck] *track* number. Reference numeral 20 represents a [truck] *track* number cancel key for canceling a [truck] *track* number to combine two [trucks] *tracks*.

Next, the operation of the apparatus will be described with reference to FIGS. 2 and 3. First, the tray open key is depressed to open the tray 12. When the tray open key 12 is again depressed after the disc is placed on the tray 12, the disc is loaded in the apparatus and the disc management information and additional information (such as titles, record dates, and the like) written in U-TOC area of the disc are read and stored in RAM 8.

At this condition, the optical pickup 1b rests on the start position of TNO 1 of the disc. Displayed on the display unit 5 is the lapse time (single time) "00:00" of TNO 1 as shown in FIG. 3 at (a).

When a user depresses the title key 14 or a corresponding key of the infrared ray remote controller 7, the controller 3 reads the title of TNO 1 from RAM 8 and displays it on the display unit 5 as shown in FIG. 3 at (b).

When the user depresses the forward key 15 or a corresponding key of the infrared ray remote controller 7, the controller 3 reads the title of the [truck] *track* next to TNO 1 from RAM 8 and displays it on the display unit 5 as shown in FIG. 3 at (c).

When the user depresses the play key 17 or a corresponding key of the infrared ray remote controller 7, the controller 3 initiates the reproduction of the musical program from the start position of TNO 2, and calculates the lapse time of TNO 2 from the address data read from the disc and displays it on the display unit 5 as shown in FIG. 3 at (d).

During the performance of the musical program of TNO 2, if the user depresses the erase key 18 or a corresponding key of the infrared ray remote controller 7, the controller 3 makes the MD record/reproduction unit 2 enter a [pose] *pause* state, and [flushes] *flashes* TNO 2 and its title as shown in FIG. 3 at (e).

Under this condition, if the user depresses again the erase key 18 or the corresponding key of the infrared ray remote controller 17, the controller 3 erases the disc management information and additional information of the [flushing] *flashing* TNO from RAM 8, renumbers other TNOs consecutively from "1", updates the contents of RAM 8, searches TNO next to the erased TNO, and displays the lapse time of the searched TNO as shown in FIG. 3 at (f).

Under this condition, if the user depresses the title key 14 or the corresponding key of the infrared ray remote controller 7, the controller 3 reads the title of the renumbered TNO under the performance and displays it for a predetermined time period on the display unit 5 as shown in FIG. 3 at (g). After the title has been displayed for the predetermined time period, the lapse time for the subject [truck] *track* is displayed as shown in FIG. 3 at (h).

If the insert key 19 is depressed, the controller 3 rewrites the management information and additional information stored in RAM 8 so that a new TNO is added having as its start position the [truck] *track* area at the time when the insert key 19 is depressed during the performance, and displays the lapse time of TNO under the performance as shown in FIG. 3 at (i).

Under this condition, if the user depresses the title key 14 or the corresponding key of the infrared ray remote controller 7, the controller 3 reads the title of the renumbered TNO under the performance from RAM 8, and displays it for the predetermined time period on the display unit 5 as shown in FIG. 3 at (j). In this case, since the title of the new TNO has not been entered, the title is left blank. After the predetermined time period, the lapse time for the TNO is displayed as shown in FIG. 3 at (k).

If the user depresses the cancel key 20, the controller 3 updates the management information and additional information for the TNO stored in RAM 8 by erasing the start position information for the TNO, and displays the lapse time for the TNO under the performance as shown in FIG. 3 at (l).

Under this condition, if the user depresses the title key or the corresponding key of the infrared ray remote controller 7, the controller 3 reads the title of the TNO under the performance from RAM 8, and displays it on the display unit 5 for the predetermined time period as shown in FIG. 3 at (m). When the tray open key 13 or the corresponding key of the infrared ray remote controller 7 is depressed, the controller 3 instructs the MD record/reproduction unit 2 to stop the reproduction and copy the management information and additional information for TNOs stored in RAM 8 to RAM 4. The contents of RAM 4 are then recorded in U-TOC area of the mini disc 1, and thereafter the MD record/reproduction unit 2 ejects the disc cartridge. During this operation, the display unit 5 displays a flushing representation as shown in FIG. 3 at (n).

In the above embodiment, the additional information for TNO may include a record date and the like as well as the program name (title). Obviously, the invention may be applied to reproduction-only optical disc reproducing apparatuses.

According to the optical disc player, the lapse time of a musical program under the performance, or the lapse time from the start address of TNO 1 is displayed in a usual case. Accordingly, the performance like an ordinary CD player can be ensured.

If the additional information such as the title of a musical program under the performance is to be known, this information can be displayed for the predetermined time period upon depression of the title key, making it easy to confirm the additional information such as the title. Since the lapse time and program [tile] *title* can be selectively displayed, large characters can be displayed on the display screen allowing an easy recognition.

Like the erase key 18, the insert key 19 and the cancel key 20 may be depressed twice for achieving the function of each key.

According to the photomagnetic disc recording/reproducing apparatus of the invention, erasing a musical program on a rewritable photomagnetic disc and adding or erasing TNO can be executed during the performance of the musical program. Accordingly, the musical program to be deleted can be confirmed by listening to it, preventing an inadvertent erase of a musical program.

What is claimed is:

1. An optical disc player for reproducing a musical program recorded on an optical disc having a TOC area storing the start and end times of each musical program and additional information, wherein a lapse time is displayed on a display unit in a usual case during the performance of a musical program, and when a title key is depressed, the additional information such as the title of a musical program is displayed on the display unit for a predetermined time period, *and after the title display for the predetermined time period the lapse time display is resumed.*

2. A photomagnetic disc recording/reproducing apparatus for reproducing a musical program recorded on a rewritable photomagnetic disc of the type that an absolute time is FM-modulated and recorded on a wobble of a groove in a program area of a record/reproduction area for each musical program and the start and end times of each recorded musical program are recorded in a user TOC area, wherein [record information of an optical musical program stored in said user TOC area and including said start time is erased by depressing an erase key during the performance of said optical musical program] *a title display is flickered by operating the first depression of an erase key during the performance of an optional musical program and record information of the optional musical program stored in said user TOC area including the start and end times is erased by operating the second depression of the erase key during the flickering display of the title* so that user TOC information of said optional musical program stored in a RAM of the recording/reproducing apparatus is erased, and that the contents of said RAM are recorded in said user TOC before said photomagnetic disc is ejected out from the recording/reproducing apparatus.

* * * * *